United States Patent Office 3,097,490
Patented July 16, 1963

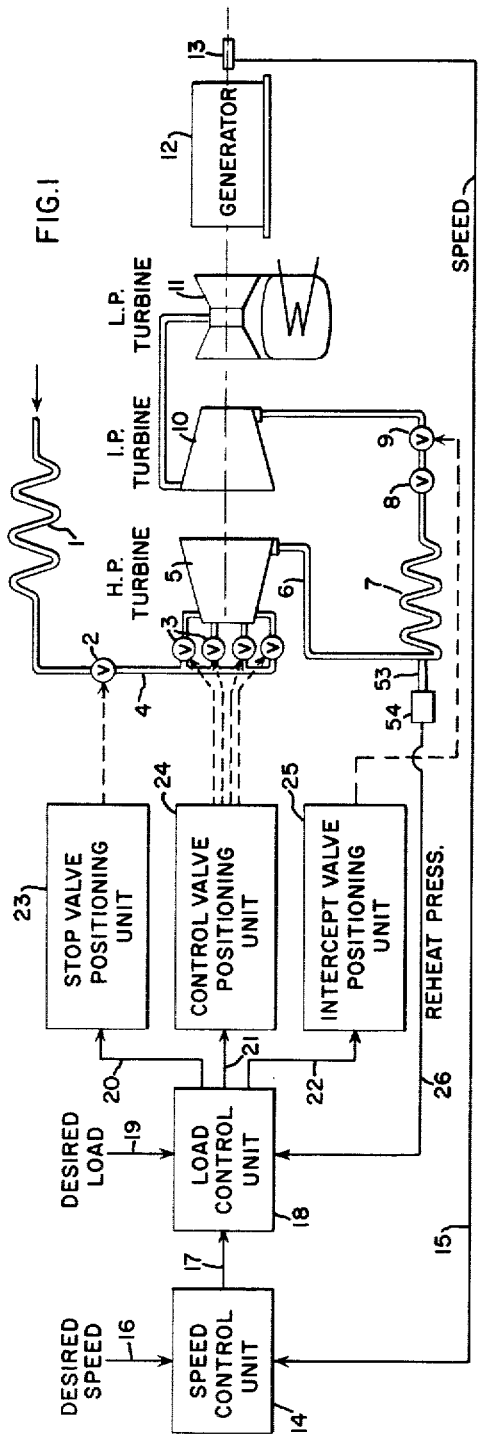
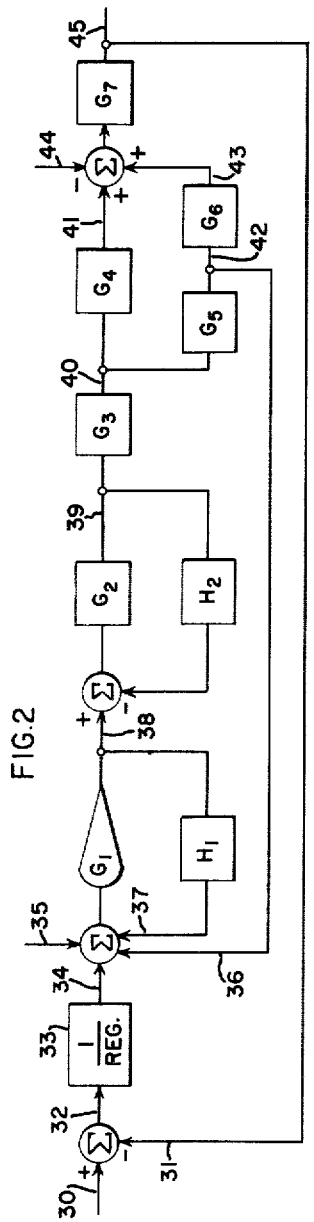
FIG.1
FIG.2
INVENTORS:
PATRICK C. CALLAN,
MARKUS A. EGGENBERGER,
PAUL E. MALONE,
PAUL H. TROUTMAN,
BY *W. C. Crutcher*
THEIR ATTORNEY.

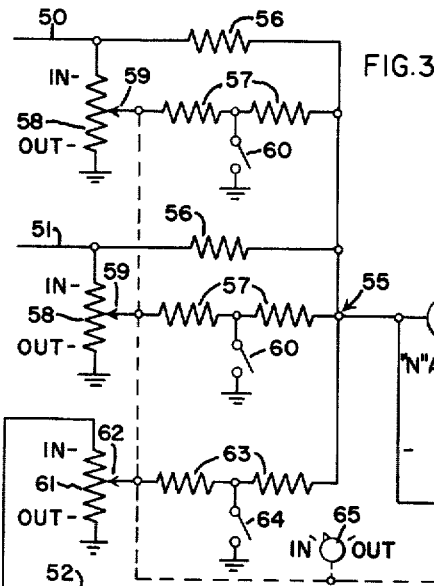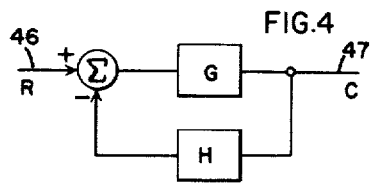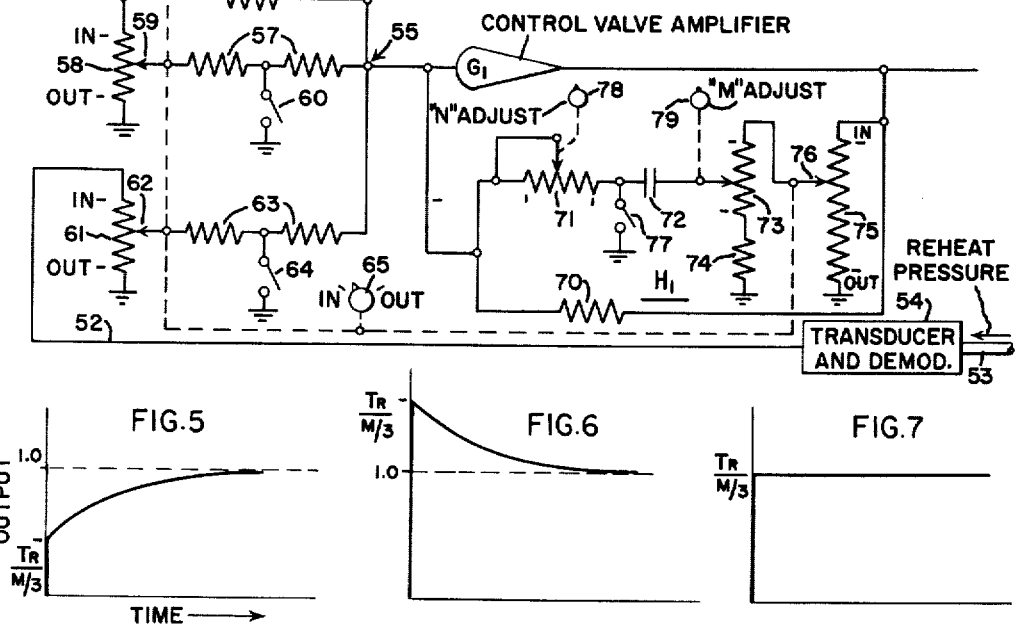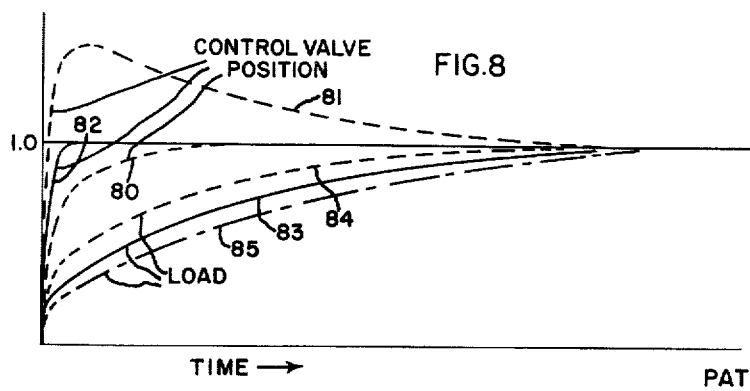

3,097,490
ELECTRO-HYDRAULIC CONTROL SYSTEM FOR TURBINE WITH PRESSURE FEEDBACK
Patrick C. Callan, Markus A. Eggenberger, Paul E. Malone, and Paul H. Troutman, all of Schnectady, N.Y., assignors to General Electric Company, a corporation of New York
Filed Apr. 23, 1962, Ser. No. 189,442
9 Claims. (Cl. 60—73)

This invention relates to control systems for steam turbine power plants with reheater, where the valves are controlled by hydraulic rams in response to electrical signals. More particularly, the invention relates to an improved arrangement for utilizing a steam pressure feedback signal representing power of the turbine to reduce variations in incremental regulation, while providing means for separately adjusting the transient response of the valves, and also including an arrangement for smoothly inserting or removing the pressure feedback signal.

Electro-hydraulic control systems for turbine power plants generally provide more flexibility than mechanical-hydraulic control systems. This is particularly true where the power plants become more complex, since relatively inexpensive electrical circuits can be used to modify the response of the turbine and can be more readily adjusted than their mechanical counterparts. An example of such an electro-hydraulic control system may be seen in U.S. Patent 2,977,768 issued in the name of J. B. Wagner and Kenneth O. Straney on April 4, 1961, and assigned to the assignee of the present application.

In very large steam turbine power plants, the high-pressure turbine is often of double-shell construction and a number of control valves operate in sequence to admit steam to the first stage through separate nozzle "arcs." The reason for using sequentially-operated control valves is to reduce the losses which would be occasioned by a single large valve operating in the partially-open position. It has been disclosed in copending application, Serial No. 149,910, filed in the names of M. A. Eggenberger, P. H. Troutman, and P. C. Callan on November 3, 1961, and assigned to the present assignee, how such sequentially-operated control valves can be positioned by separate electro-hydraulic servo motors, and how a pressure feedback signal can be used to reduce nonlinearities caused by a nonlinear steam flow-valve opening characteristic. In other words, the measurement contemplated there was the pressure measurement representing a summation of flows for all of the valves. The pressure measurement is an almost instantaneous indication of total flow, provided that the pressure is measured immediately downstream of the control valves. Such a pressure measurement is, however, difficult to obtain in a double-shell turbine, since the pressure must be taken from inside the inner shell.

Since most of the larger reheat turbines are built with a double-shell high-pressure section, the first location where a pressure measurement can be obtained through a single shell is at the point where the steam leaves the high-pressure section to enter the reheater. At this point, the steam is cooler, is at a lower pressure, and the pressure measurement is relatively "noise-free." The primary objection to using this so-called "cold" reheat pressure for a feedback signal has been the time lag from the time when the control valves move to a more open position to the time when the reheat steam pressure corresponding to this flow builds up in the reheater. This time lag is due primarily to the volume of the reheater tubes. If this pressure were used as a feedback signal, the time lag would cause the control valve to open too wide and to overshoot the new desired position. Overshooting of the control valves can be very serious, since the valves may "request" more steam flow than the boiler can produce. This can bring about fluctuations in initial temperature and pressure which the boiler controls can not accommodate.

It is desirable in some cases to operate the power plant without the pressure feedback signal. For instance, sometimes at light loads the stop valves ahead of the control valves can be used to control the primary admission of steam. Also, in case of malfunction of the pressure feedback components, it is desirable to continue to operate the power plant without pressure feedback while the components are repaired. Hence, it would be desirable to add or remove the pressure feedback signal without changing the load carried by the turbine.

Accordingly, one object of the present invention is to provide an improved arrangement for utilizing the steam pressure of the reheater to provide a feedback signal representing turbine power.

Another object of the invention is to provide an improved arrangement for gradually applying or removing the pressure feedback signal without substantially affecting the steady state response of the turbine to changes in speed or load.

Still another object of the invention is to provide an electro-hydraulic control system using reheat pressure feedback with additional means to adjust the transient response of the valves so as to match the demands of a particular turbine power plant with the capacity of a particular boiler installation.

Another object of the invention is to provide an improved arrangement for adjusting the transient response of the control valves to suit a particular power plant having pressure feedback, with additional means to apply or remove any portion of the pressure feedback signal at will, without substantially affecting the steady state operation of the installation.

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 1 is a simplified schematic diagram of a reheat turbine power plant with an electro-hydraulic control system, FIG. 2 is a simplified functional block diagram of the turbine power plant depicted as a servomechanism, FIG. 3 is an electrical circuit diagram of the signal-modifying network employed in the present embodiment, FIG. 4 depicts a functional block diagram of a simple closed-loop servomechanism for purposes of explanation, FIGS. 5–7 are graphs illustrating the transient response obtainable with the closed loop of FIG. 4, using the teaching of the invention, and FIG. 8 is a graph indicating the types of valve transient response and resulting load response obtainable in a typical turbine power plant of the type shown.

Briefly stated, the invention is practiced by providing an electrical circuit for modifying the valve positioning signal, in accordance with an inherent lag in the pressure feedback signal. The circuit also includes adjustments for matching the valve transient response to suit the individual boiler-turbine installation. Additional means are provided to apply any amount of pressure feedback or to remove it entirely without substantially affecting the steady state position of the valves or the load on the turbine.

*Schematic Diagram (FIG. 1)*

Referring to FIG. 1 of the drawing, steam flowing from superheater coil 1 passes through a stop valve 2 and through one or more control valves 3 fed from a common valve chest or conduit 4, to high-pressure turbine 5. Exhaust steam from turbine 5 flows through conduit 6 to reheater 7, and thence through reheat stop valve 8 and intercept valve 9 to the intermediate pressure turbine 10. The steam then flow throug low-pressure turbine 11 which, together with high-pressure turbine 5 and intermediate-pressure turbine 10, drives a load such as generator 12. A speed sensing device 13, such as a tachometer generator or variable reluctance pickup, transmits a signal indicating actual speed to the speed control unit 14 via line 15, where it is matched with a desired or reference speed signal 16. The error in speed, if any, is transmitted over line 17 to the load control unit 18, wherein it is further modified and summed with a desired or reference load signal 19. Valve positioning signals 20, 21, 22 are derived in the load control unit 18 and transmitted to a stop valve positioning unit 23, a control valve positioning unit 24, and an intercept valve positioning unit 25. The valve positioning units move their respective valves to the proper positions as indicated by the doted lines. This much of the apparatus of FIG. 1 is described in more detail in the aforementioned copending application, Serial No. 149,910.

In accordance with the invention, the reheat pressure, preferably taken at the entry to reheater 7, is sensed and fed back as indicated by line 26 to the load control unit 18.

The details of speed control unit 14, valve positioning units 23, 24, 25, and most of the load control unit 18 are not material to the present invention. The present invention is concerned primarily with the modification of the signals entering the load control unit, particularly as they are applied to the control valve positioning unit 24.

The valve positioning units may be of the type described in the aforementioned U.S. Patent 2,977,768 wherein they serve to position the valves in proportion to the magnitude of a suitable electrical signal. The control valve unit 24 preferably has additional provisions for opening control valves 3 in sequence by applying electrical biasing signals of varying magnitude to the individual control valve servos, as more particularly described in the aforementioned copending application Serial No. 149,910. For the purpose of the present application, however, the control valve positioning unit 24 can be thought of as operating a single "equivalent" control valve (substituted for the group of individual control valves), with such nonlinearity of operation as to make pressure feedback desirable.

The speed and load control units 14, 18 serve to compare the actual speed signal with a "desired speed" signal and to superimpose thereon a "desired load" signal. These input signals are preferably converted into analog quantities by means well known in the art, and are summed within the control units. Thus the electrical outputs from the load control unit set the valve positions as desired and constantly correct the valve positions in accordance with the changing inputs to the control units.

For the purpose of simplifying the present description, it will be assumed that the control valve positioning unit 24 is controlling the admission of steam to the turbine, and that the speed is substantially constant. That is to say, the generator is connected to an electrical system fed by other similar generators, and this electrical interconnection tends to hold the speed of generator 12 substantially constant at the speed of the other interconnected generators. Hence, there will normally be an insignificant "speed error signal" appearing in line 17, and the primary control of the unit will be carried out by means of adjusting the load input 19 so as to select the share of the total load on the interconnected generators which is carried by the unit.

*Functional Block Diagram (FIG. 2)*

FIG. 2 illustrates the functional block diagram of the turbine power plant as a servomechanism when operating on the control valves 3. The blocks represent the "transfer functions" of the various control system elements, which are often expressed in LaPlace transform notation. The "desired speed" reference signal in line 30 is summed with a negative speed feedback signal in line 31 to provide a speed error signal in line 32. A multiplier circuit 33 modifies the speed error signal in accordance with the desired speed regulation (valve movement per increment of speed change), to produce a modified speed error signal in line 34.

As mentioned previously, when the generator is "on the line" (connected to a distribution system containing other similar generators), the speed error signal in line 34 will be substantially zero and the elements 30–34 can be disregarded. Load is added to or taken off the turbine by changing the "desired load" reference input signal in line 35 and applying it to control valve amplifier $G_1$, together with a reheat pressure feedback signal from line 36 and an additional modifying feedback signal from line 37. The effects of the feedback transfer function $H_1$ applied to amplifier $G_1$, in relation to the over-all system, is one of the primary features of the invention.

A resulting valve positioning signal appears in line 38 and is applied to the valve positioner $G_2$. Block $G_2$ represents a number of elements including additional electrical amplifying stages and hydraulic mechanisms for positioning the valve. A signal representing actual valve position can be fed back through $H_2$, which is a modifying circuit to provide improved linearity of steam flow with valve positioning signal, as more particularly disclosed in the aforementioned copending application Serial No. 149,910. The valve position represented by line 39 produces the steam pressure in line 40, the nonlinearity of steam flow with respect to valve position being represented by block $G_3$. The steam pressure in line 40 is first-stage pressure immediately downstream of the control valves 3 and is at the entry to the high-pressure turbine 5. When steam passes through the high-pressure turbine 5, represented by block $G_4$, the first-stage pressure manifests itself as torque on the high-pressure turbine rotor, depicted by line 41. The steam flowing from the high-pressure turbine 5 then enters the reheater 7 to manifest itself as a reheat pressure in line 42. Associated time lags, due primarily to the relatively long time constant required to build up pressure in the reheater and interconnecting piping (caused by their volumes), are represented by the transfer function $G_5$. The reheat pressure supplied to the intermediate-pressure and low-pressure turbines 10, 11, represented by block $G_6$, results in additional torque, shown in line 43.

Typically, in powerplants of this sort, about 25% of the total torque (due to the high-pressure turbine 5) would appear in line 41 and the remaining 75% of the torque would be represented by line 43. The generator load, represented as a negative torque in line 44, is then applied and the difference in torques, applied to the rotational moments of inertia of turbine and generator rotors, represented by block $G_7$, results in an actual turbine speed at line 45.

*Simplified Block Diagram (FIG. 4)*

Since we will primarily be considering the effects of changes in the load reference on the valve position, FIG. 2 can be considerably simplified, as seen in FIG. 4. There a simple closed-loop servomechanism is depicted with the "input" R shown at 46 being primarily a "desired load" signal corresponding to load reference 35 of FIG. 2. The "output" C which we wish to examine is the control valve position 47 corresponding to line 39 in FIG. 2. The transfer function G represents the amplifier $G_1$ with feedback $H_1$ and the transfer function H represents the reheater transfer function $G_5$ in FIG. 2 (all other elements being omitted, since their time constants are relatively short compared to those being considered. In other words, the transfer functions associated with $G_2$, $H_2$, $G_3$ in FIG. 2 are neglected for purpose of analysis).

It is to be understood that, although input R to the simplified representation of FIG. 4 will be considered as adjustments in load, this input can also be considered to represent changes in speed due either to a loss of load by the individual turbine generator considered, or changes in speed due to a change in "system frequency" of the interconnected generators in the distribution network.

*Control Valve Amplifier—Steady State (FIG. 3)*

Referring now to FIG. 3 of the drawing, the control valve amplifier $G_1$ is an "operational amplifier," which is a commercially obtainable electronic device, preferably solid state, such as is used in analog computers to perform various operations such as addition, multiplication, integration, etc. on a D.-C. input signal. The operational amplifier $G_1$ is a high gain, wide band D.-C. amplifier. This operational amplifier might, for instance, be of the type described in chapter 5 of "Electronic Analog Computers," by D. A. Korn and T. M. Korn, McGraw-Hill, New York, 1952.

The inputs to control valve amplifier $G_1$ comprise a D.-C. potential in lead 50, which is the speed error signal after it has been adjusted for the desired regulation of the control valves (line 34 in FIG. 2), and a D.-C. potential in lead 51 (line 35 in FIG. 2) representing a desired load on the turbine when it is at rated speed.

An additional signal supplied to amplifier $G_1$ is the reheat pressure feedback signal, which is a D.-C. potential appearing in lead 52. The pressure feedback signal is obtained from a conduit 53 communicating with the reheater inlet, which provides pressure for actuating a suitable transducer 54. Transducer 54 may be a strain-gauge type with a bridge actuated by a diaphragm and associated energizing windings for obtaining a D.-C. potential in lead 52 which is proportional to the pressure in conduit 53. An example of such a pressure transducer for obtaining a D.-C. potential proportional to pressure may be seen in the aforementioned U.S. Patent 2,977,768.

The speed error signal in lead 50 is applied to the current summing junction 55 of amplifier $G_1$ through a parallel circuit comprising a resistance 56 connected in parallel with resistances 57. A voltage divider 58, connected to ground and having a movable tap 59, provides means either to effectively connect resistances 57 in parallel with resistance 56 or to remove the effect of resistances 57 on the input signal by moving tap 59 either to the "in" or the "out" position respectively. Thus, when tap 59 is moved to the "out" position, the input signal in line 50 provides a current determined by the values of resistances 56, 57. An additional grounding switch 60 may be used to remove the effect of resistances 57 instantly without the necessity of moving tap 59.

The load reference input signal in lead 51 is also connected to the input junction 55 by means of a similar variable impedance arrangement. Since the resistances there generally perform the same function for signal 51 as previously described with respect to input signal 50, they are designated with the same reference numerals without further explanation.

The values of resistances 56, 57 are carefully selected with regard to other factors to be mentioned, so that the respective conductances between leads 50, 51 and the junction 55 when taps 59 are in the "in" position are a predetermined multiple of the respective conductances between leads 50, 51 and junction 55 when taps 59 are in the "out" position. This multiple, which is designated K herein, thus represents the factor by which the input signals in leads 50, 51 are increased at junction 55 when the taps 59 are in the "in" position.

The pressure feedback signal appearing in lead 52 is of such a polarity with respect to the signals in leads 50, 51 that an increase in reheat pressure which has been occasioned by an increase in valve opening, caused by an increase in signals 50, 51, will produce a signal in lead 52 which opposes or seeks to reduce the magnitude of the input signal applied to junction 55. This "negative feedback" signal is applied through a voltage divider 61 with a movable tap 62, and through resistances 63 to the junction 55. Thus, when tap 62 is in the "in" position, the feedback signal will be applied to junction 55 through resistances 63, whereas when tap 62 is in the "out" position, there will be no pressure feedback. Resistances 63 are selected with regard to the factor K, as will be described, to maintain the steady state gain of the valves substantially constant with respect to the input signal, whether the loop is open or closed, or at an intermediate point. As before, a grounding switch 64 is provided to remove the pressure feedback signal quickly.

The potentiometer taps 59, 62 are ganged so as to be operated by a single control knob 65. In actual practice, the control knob 65 would be supplemented by a suitable reversible electric motor for operation from a remote location, together with a slip clutch to permit turning knob 65 manually.

The aforedescribed system provides means to apply or remove the pressure feedback or to apply any desired proportion of pressure feedback, without substantially affecting the steady state gain of the turbine-generator, and hence without changing the generator load substantially while it is "on the line." By constant steady state gain, it is meant that a given change in "desired load" input signal produces the same "actual load" on the generator, after transients have died out.

*Operation—Steady State (FIG. 4)*

The means by which reheat pressure feedback is removed and added may be understood by considering FIG. 4, where the forward transfer functions are lumped as a single G and the pressure feedback transfer function is represented by H. The output C of such a closed loop is equal to the following expression:

$$C = R \times \frac{G}{1+GH} \qquad (1)$$

where R is the input variable. If the loop is opened, i.e., feedback H removed, the output C will be simply $$C = R \times G \qquad (2)$$

It is to be understood that G and H will normally be complex quantities, i.e., a magnitude with an associated phase angle, but since we are discussing the steady state condition, we can consider them as magnitudes only. Since it is desired that the steady state gain be the same both with and without pressure feedback, it is clear that if Equation (1) were modified as follows:

$$C = RK \frac{G}{1+GH} \qquad (3)$$

where K is a factor multiplying the input signal R, and additionally if we insure that, during steady state:

$$K = 1 + GH \qquad (4)$$

then the steady state output C will be the same whether feedback is employed or not. Naturally the transient response will be different without feedback, but we are now considering only the steady state.

Therefore, for the selected value of G in the forward loop, the resistances 63 attenuating the pressure feedback signal can be selected such that the criterion of Equation (4) is met. In other words, for every value of K, there is a corresponding value of H. H and K are varied simultaneously to maintain C at a constant value.

For example, if the forward loop gain G is 1 and if the steady state feedback magnitude H is equal to 2, Equation (4) dictates that $K=3$. This means that, for a feedback gain of $H=2$, the conductance through the parallel resistances 56, 57 should be 3 times as large when the feedback is "in" as the conductance through these branches is when the feedback is "out."

It can also be shown that, due to the linear nature of Equation (4), the steady state gain C/R will be constant for each increment or corresponding movement of potentiometer taps 59, 62, using linear potentiometers. Thus, feedback can be smoothly and gradually inserted or removed without affecting the steady state gain of the turbine.

*Control Valve Amplifier—Transient Response (FIG. 3)*

As mentioned previously, the pressure feedback signal has a lagging characteristic due to the relatively long time constant of the reheater in building up or dropping to a new steady-state pressure. This time constant may be on the order of 3 to 11 seconds, which is considerably greater than that of the electronic and hydraulic devices in the turbine control system. The reheat pressure feedback, represented by H in FIG. 4, has a transfer function of the form:

$$H(s) = \frac{1}{1 + T_R S} \quad (5)$$

where the transfer function is expressed as a LaPlace transform, and where $T_R$ is the reheater time constant and S is the complex frequency variable.

In order to compensate for this lag, a feedback network $H_1$ is added to operational amplifier $G_1$ as shown in FIG. 3. This circuit $H_1$ is separately termed a "lead-lag network"; however, when applied as a feedback to the operational amplifier $G_1$, the closed loop response is that a "lag-lead network." The combination of $G_1$ and its feedback network $H_1$ when considered together is represented by G of FIG. 4 (disregarding the elements with short time constants) and has a transfer function of the form:

$$G(S) = \frac{1 + NS}{1 + MS} \quad (6)$$

where N is the time constant of the lead term and where M is the time constant of the lag term.

The network $H_1$ comprises a resistor 70 connected in parallel with the series combination of an adjustable resistor 71 and a capacitor 72. The voltage applied to capacitor 72 is taken from an adjustable voltage divider 73, the lower end of which is connected to ground through a resistance 74. An additional voltage divider 75, having a movable tap 76 mechanically connected to move with taps 59 and 62, serves either to connect elements 71, 72 in parallel with resistor 70 or to remove the effect of these elements, when the pressure feedback knob 65 is turned "in" or "out" respectively. As before, a switch 77 is provided to ground the upper branch of the parallel circuit quickly.

Adjustable resistor 71 is provided with an adjusting knob 78 which serves to vary the time constant N in Equation (6) in a manner known to those skilled in the art. Similarly, adjustable resistor 73 is provided with knob 79 which serves to adjust the time constant M of Equation (6). Preferably, knob 78 is set so that the time constant N is approximately equal to the time constant $T_R$ of the reheater. When this is done, the other knob 79 can be employed to adjust the transient response of the control valves for changes in the input signal so as to match the transient response of the control valve with the ability of the boiler to accommodate changes in load.

*Operation—Transient Response (FIG. 4)*

If the expression of Equation (6) is multiplied by a factor of 3, and if the expression of Equation (5) is multiplied by a factor of 2/3, and the resulting quantities are inserted into Equation (1), it will be seen that the over-all closed loop response of FIG. 4 has a steady state gain of 1. Next, if the time constant N is made equal to the reheater time constant $T_R$ by adjusting knob 78, the closed loop response of FIG. 4 reduces to the expression:

$$\frac{C}{R} = \frac{1 + T_R S}{1 + \left(\frac{M}{3}\right) S} \quad (7)$$

This has a constant term in the numerator and, as explained previously, the term M in the denominator can be varied by adjusting knob 78. Thus, the value $$\frac{M}{3}$$

can be made smaller than $T_R$ to produce a "lead-lag" response, or $$\frac{M}{3}$$

can be made greater than $T_R$ to give a "lag-lead" response. If M is adjusted so that $$\frac{M}{3}$$

exactly equals $T_R$, the expressions cancel and the transient response will exactly match that of the input signal.

FIG. 5 illustrates the transient response to a step input signal when $T_R$ is less than $$\frac{M}{3}$$

in which Equation (6) gives a response characteristic of a lag-lead, where the control valves will jump immediately to a value $$\frac{T_R}{M/3}$$

and then slowly rise to the input value.

FIG. 6 illustrates the reverse situation, where the reheater time constant $T_R$ is greater than $$\frac{M}{3}$$

which is characteristic of a lead-lag response. Here the control valves would jump to a value higher than their steady state value, again $$\frac{T_R}{M/3}$$

and then move slowly to their steady state value.

FIG. 7 illustrates the case where $T_R$ is equal to $$\frac{M}{3}$$

In this case, the control valves would immediately jump to their stead state value.

Of course, FIGS. 5, 6 and 7 represent ideal responses, neglecting the other short-time constants in the system. Actual typical responses of the control valve for a step input load would appear as more rounded curves and might be represented, for example in FIG. 8, by curves 80, 81, 82 corresponding to FIGS. 5–7 respectively. It can be seen that according to curve 82, for a step input of the load reference, the control valves move immediately to the new position corresponding to that load signal, almost approximating a step output in first-stage pressure (disregarding the relatively short time constants of the hydraulic valve positioning servomotor and the electronic components). The corresponding load curve 83, indicated by a solid line, is seen to rise abruptly at first, which represents the portion of load supplied by the high-pressure turbine, and then to increase more gradually as the reheater pressure builds up and additional load is supplied by the intermediate pressure and low-pressure turbine.

Curve 81 indicates the result of an adjustment of the control valve amplifier feedback, by means of knob 79, so that the control valve overshoots and then returns to its new position gradually. The corresponding load curve is indicated at 84 by a dashed line and it should be apparent that a larger proportion of load is applied immediately by the high-pressure turbine during the abrupt initial rise of the load curve, and that it then rises slowly as before as the reheater pressure builds up.

Curve 80 indicates that the control valve movements are damped somewhat in approaching their new value and the corresponding load curve 85 indicates a more gradual increase in load.

Thus, it can be seen that by adjusting the control valve amplifier feedback with the "M" adjusting knob, the load curves 83, 84, 85 can be adjusted so that they are compatible with the capacity of the boiler to furnish sufficient steam during abrupt changes in load.

Although the foregoing description has been oriented toward changes in a load signal which is applied separately from the speed error signal, it is also within the purview of the invention for the input signal to be a speed error signal alone, where the turbine generator is operating independently—i.e., not tied to an external network containing other generators which hold its speed constant. The transient response of the control valves in this case would be as before, with the exception that the input would be a speed error resulting from a speed change.

As mentioned previously, the invention provides means to remove the pressure feedback while proportionately decreasing the load and speed error input signals to make up for the increased gain occurring when the loop is opened. Although the steady state gain of the system will be substantially constant, as previously described, the transient responses with and without feedback would be different. Hence, when the pressure feedback is removed by turning knob 65 in FIG. 3, the knob also moves tap 76 on the feedback circuit $H_1$ to gradually remove the portion of this circuit which is affected by transient signals. The steady state gain of the control valve amplifier $G_1$, due to its feedback circuit $H_1$, is determined only by the resistor 70. Hence, when potentiometer 76 is moved to the "out" position, the steady state gain of $G_1H_1$ is not affected, and the previous criterion for holding the steady state gain of the whole system constant, with and without pressure feedback, is met.

Thus, it will be seen that this improved arrangement for an electro-hydraulic control system for a turbine power plant allows reheat pressure to be used as a pressure feedback signal for more nearly linear signal-to-load characteristic of the control valves, without the attendant difficulties caused by the lag in build-up of the reheat pressure signal. In fact, this lag is gainfully employed, when using the adjustable network $H_1$, to obtain varying transient responses of the control valves, so as to adjust the load curve, as in FIG. 8. The arrangement further provides for removing the pressure feedback signal smoothly, without affecting the calibration of the load input reference, and without substantially changing the load on the generator.

While there has been described what is at present considered to be the preferred embodiment of the invention, it will be understood that various modifications may be made therein, and it is intended to cover in the appended claims all such modifications as fall within the true spirit and scope of this invention.

What is claimed as new and is desired to be secured by Letters Patent of the United States is:

1. In a steam turbine powerplant having valve means, high pressure turbine, reheater, and lower pressure turbine connected in series flow relationship, the combination of:
   electro-hydraulic control means positioning said valve means in response to a first electrical signal representing a desired steam flow through said valve means,
   first means furnishing an electrical feedback signal to said control means for modifying the effect of said first signal on the valve means, said feedback signal being responsive to steam pressure in the reheater and having a lagging characteristic,
   and second means including a first adjustable network for independently adjusting the transient response of said valve means to changes in said first signal while also compensating for the lag in the reheat pressure feedback signal.

2. In a steam turbine powerplant having valve means, high pressure turbine, reheater, and lower pressure turbine connected in series flow relationship, the combination of:
   electro-hydraulic control means positioning said valve means in response to a first electrical signal representing a desired steam flow through said valve means,
   first means furnishing an electrical feedback signal to said control means for modifying the effect of said first signal on the valve means, said feedback signal being responsive to steam pressure in the reheater and having a lagging characteristic,
   second means including a first adjustable network for independently adjusting the transient response of said valve means to changes in said first signal, while also compensating for the lag in the reheat pressure feedback signal,
   said second means also including a second adjustable network for simultaneously gradually removing said feedback signal and attenuating said first signal by a factor such that the steady state response of the valve means to the first signal remains substantially constant.

3. In a steam turbine powerplant having valve means, high pressure turbine, reheater, and lower pressure turbine connected in series flow relationship, the combination of:
   electro-hydraulic control means including operational amplifier means, and positioning said valve means in response to a first electrical signal representing a desired steam flow through said valve means,
   first means furnishing an electrical feedback signal to the input of said operational amplifier for modifying the effect of said first signal on the valve means, said feedback signal being proportional to the steam pressure in the reheater and opposing said first signal, and significantly lagging movements of the valve means,
   and second means including a passive network providing a feedback for said operational amplifier, said passive network having provision for adjusting both the leading and lagging characteristics of said network, whereby said second means may be adjusted to determine the transient response of said valve means to changes in said first signal while also compensating for the lag in the reheat pressure feedback signal.

4. In a steam turbine powerplant having valve means, high pressure turbine, reheater, and lower pressure turbine connected in series flow relationship, the combination of:
   electro-hydraulic control means including an operational amplifier and positioning said valve means in response to a first electrical signal representing a desired steam flow through said valve means,
   first means furnishing an electrical feedback signal to the input of said operational amplifier for modifying the effect of said first signal on the valve means, said feedback signal being proportional to steam pressure in the reheater and opposing said first signal and significantly lagging movements of the valve means,
   second means including a first adjustable passive network connected to supply a feedback signal around said operational amplifier, said first network having provision for adjusting the leading and lagging characteristics of the network, whereby the transient response of said valve means to changes in said first signal can be varied, while also compensating for the lag in the reheat pressure feedback signal,
   said second means also including a second passive network including impedance means for simultaneously attenuating said first signal and said feedback signal, while ultimately removing the portion of said first network affecting transient response of the valve means, the factor of attenuation of said first signal by said impedance means being such that the steady state response of the valve means to said first signal remains substantially constant.

5. In a steam turbine powerplant having valve means, high pressure turbine, reheater, and lower pressure turbine connected in series flow relationship, the combination of:

electro-hydraulic control means positioning said valve means in response to first and second electrical signals representing deviation from no-load rated speed and representing a desired proportion of full load respectively, said first and second signals together indicating a desired steam flow through said valve means, first means furnishing an electrical feedback signal to said control means for modifying the effect of said first and second signals on the valve means, said feedback signal being responsive to steam pressure in the reheater and significantly lagging movements of the valve means, second means further modifying the effect of said first, second and feedback signals on the valve means to compensate for the lag in said feedback signal, and a plurality of ganged impedance means connected to gradually attenuate said first, second and feedback signals and to gradually removed said second lag compensating means, the amount by which said signals are attenuated being such that the steady state response of the valve means to said first and second signals remains substantially constant.

6. The combination according to claim 5 including a plurality of switching means connected for disabling said first means, said second means, and said ganged impedance means.

7. In a steam turbine powerplant having valve means, high pressure turbine, reheater, and lower pressure turbine connected in series flow relationship, the combination of:

electro-hydraulic control means including an operational amplifier and positioning said valve means in response to first and second electrical signals representing deviation from a desired no-load rated speed and representating a desired proportion of turbine load respectively, said first and second signals together representing a desired steam flow through said valve means, first means furnishing an electrical feedback signal to the input of said operational amplifier for modifying the effect of said first and second signals on the valve means, said feedback signal being proportional to steam pressure in the reheater and opposing said first and second signals, and having a lagging characteristic, and second means including a passive electrical network connected as a feedback around said operational amplifier, said network including variable impedance means for separately adjusting the lead and lag time constants of said network, the lead time constant of said network being adjusted to substantially correspond to the lag time constant of the reheater pressure feedback signal, whereby the lag time constant of the network can be separately adjusted to control the transient response of said valve means to changes in the first and second signals.

8. The combination according to claim 6 including a second network for simultaneously and proportionately attenuating said first, second, and feedback signals, and for ultimately removing the transient effect of said second means.

9. In an elastic fluid turbine powerplant having valve means, a high pressure turbine section and at least one lower pressure energy converting device connected in series flow relation to receive motive fluid from said valve means, the combination of:

servo means positioning the valve means in response to a first signal representing a desired rate of motive fluid flow to the high pressure turbine section, first means furnishing an electrical feedback signal to said servo means for modifying the effect of the first signal on the valve means, said feedback signal being responsive to motive fluid pressure at a location downstream from the high pressure turbine second and having a lagging characteristic relative to the position of said valve means, and second means including a first adjustable network for independently adjusting the transient response of said valve means to changes in said first signal while also compensating for the lag in said feedback signal.

No references cited.

UNITED STATES PATENT OFFICE
CERTIFICATE OF CORRECTION

Patent No. 3,097,490　　　　　　　　　　　　　　　　　　July 16, 1963

Patrick C. Callan et al.

It is hereby certified that error appears in the above numbered patent requiring correction and that the said Letters Patent should read as corrected below.

Column 12, line 36, for "second" read -- section --.

Signed and sealed this 10th day of December 1963.

(SEAL)
Attest:

ERNEST W. SWIDER

Attesting Officer

EDWIN L. REYNOLDS

Acting Commissioner of Patents